(12) United States Patent
Tamura et al.

(10) Patent No.: US 12,160,773 B2
(45) Date of Patent: Dec. 3, 2024

(54) WIRELESS COMMUNICATION CONTROL METHOD, DISPLAY DEVICE, AND WIRELESS COMMUNICATION SYSTEM

(71) Applicant: SEIKO EPSON CORPORATION, Tokyo (JP)

(72) Inventors: Yuki Tamura, Azumino (JP); Kazuki Nagai, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 307 days.

(21) Appl. No.: 17/681,266

(22) Filed: Feb. 25, 2022

(65) Prior Publication Data

US 2022/0279387 A1    Sep. 1, 2022

(30) Foreign Application Priority Data

Feb. 26, 2021    (JP) ................................. 2021-029628

(51) Int. Cl.
| | | |
|---|---|---|
| *H04W 76/15* | (2018.01) | |
| *H04W 28/18* | (2009.01) | |
| *H04W 28/24* | (2009.01) | |
| *H04W 48/16* | (2009.01) | |
| *H04W 12/04* | (2021.01) | |

(52) U.S. Cl.
CPC .......... *H04W 28/18* (2013.01); *H04W 28/24* (2013.01); *H04W 48/16* (2013.01); *H04W 76/15* (2018.02); *H04W 12/04* (2013.01)

(58) Field of Classification Search
CPC ..... H04W 28/18; H04W 28/24; H04W 48/16; H04W 76/15; H04W 12/04; H04W 12/73; H04W 84/12; H04W 12/0431; H04W 48/08; H04W 76/11
See application file for complete search history.

(56) References Cited

U.S. PATENT DOCUMENTS

| | | | |
|---|---|---|---|
| 10,999,331 B1 * | 5/2021 | Marchand | ............. H04L 65/403 |
| 2010/0067406 A1 | 3/2010 | Suzuki | |
| 2016/0294485 A1 * | 10/2016 | Ma | ......................... H04W 76/14 |
| 2018/0020495 A1 * | 1/2018 | Nakayama | ............... H04L 63/18 |
| 2018/0152973 A1 | 5/2018 | Ueno et al. | |

(Continued)

FOREIGN PATENT DOCUMENTS

| | | |
|---|---|---|
| CN | 108124255 A | 6/2018 |
| JP | 2011-188518 A | 9/2011 |

(Continued)

*Primary Examiner* — Hanh N Nguyen
(74) *Attorney, Agent, or Firm* — Oliff PLC (57) ABSTRACT

A wireless communication control method includes transmitting first connection information by a first wireless communication device of a display device, when a connection request using the first connection information from a first transmission source is received by the first wireless communication device, determining whether the first transmission source satisfies a condition or not, transmitting second connection information to the first transmission source when it is determined that the first transmission source satisfies the condition, and when a connection request using the second connection information is received by the first wireless communication device, starting a connection using the second connection information between the first transmission source and the first wireless communication device.

7 Claims, 7 Drawing Sheets

(56) References Cited

U.S. PATENT DOCUMENTS

| | | |
|---|---|---|
| 2018/0252991 A1 | 9/2018 | Tomita |
| 2021/0133448 A1* | 5/2021 | Kim .................... G06F 3/04842 |
| 2023/0188832 A1* | 6/2023 | Xu ...................... G06F 3/04817 |
| | | 348/333.01 |

FOREIGN PATENT DOCUMENTS

| | | |
|---|---|---|
| JP | 2012-186516 A | 9/2012 |
| JP | 2012-191411 A | 10/2012 |
| JP | 2014-103530 A | 6/2014 |
| JP | 2017-55186 A | 3/2017 |
| JP | 2018-4833 A | 1/2018 |
| JP | 2018-121344 A | 8/2018 |
| JP | 2019-186878 A | 10/2019 |
| JP | 2020-027996 A | 2/2020 |

* cited by examiner

FIG. 7

WIRELESS COMMUNICATION CONTROL METHOD, DISPLAY DEVICE, AND WIRELESS COMMUNICATION SYSTEM

The present application is based on, and claims priority from JP Application Serial Number 2021-029628, filed Feb. 26, 2021, the disclosure of which is hereby incorporated by reference herein in its entirety.

BACKGROUND

1. Technical Field

The present disclosure relates to a wireless communication control method, a display device, and a wireless communication system.

2. Related Art

According to the related art, a device that has a plurality of pieces of connection information such as SSIDs (service set identifiers) and can execute an automatic wireless setting with respect to at least one piece of connection information, of the plurality of pieces of connection information, is known, like a wireless LAN access point device disclosed in JP-A-2019-191411.

However, when connection information is made public, the number of information processing devices connected based on the connection information that is made public cannot be managed and communication quality may drop due to an excessive number of connections.

SUMMARY

An aspect of the present disclosure is directed to a wireless communication control method for a display device having a first wireless communication device. The wireless communication control method includes: causing the first wireless communication device to transmit first connection information for a provisional connection; when a connection request using the first connection information is received by the first wireless communication device, determining whether a transmission source of the connection request is a transmission source satisfying a preset condition or not; transmitting second connection information for a regular connection to the transmission source when the transmission source is a transmission source satisfying the preset condition; and when a connection request using the second connection information is received by the first wireless communication device, starting the regular connection using the second connection information with the transmission source of the connection request.

Another aspect of the present disclosure is directed to a display device including a first wireless communication device and a control unit controlling the first wireless communication device. The control unit causes the first wireless communication device to transmit first connection information for a provisional connection. When a connection request using the first connection information is received by the first wireless communication device, the control unit determines whether a transmission source of the connection request is a transmission source satisfying a preset condition or not. The control unit transmits second connection information for a regular connection to the transmission source when the transmission source is a transmission source satisfying the preset condition. When a connection request using the second connection information is received by the first wireless communication device, the control unit starts the regular connection using the second connection information with the transmission source of the connection request.

Still another aspect of the present disclosure is directed to a wireless communication system including: a display device having a first wireless communication device; an information processing device having a third wireless communication device; and a wireless communication device. The display device causes the first wireless communication device to transmit first connection information for a provisional connection. When a connection request using the first connection information is received by the first wireless communication device, the display device determines whether a transmission source of the connection request is a transmission source satisfying a preset condition or not. The display device transmits second connection information for a regular connection to the transmission source when the transmission source is a transmission source satisfying the preset condition. When the first connection information is received by the third wireless communication device, the information processing device transmits a connection request using the received first connection information to the display device. When the second connection information is received from the display device, the information processing device sets the second connection information in the wireless communication device connected to the information processing device, controls the wireless communication device, and starts the regular connection based on the second connection information with the display device.

DESCRIPTION OF EXEMPLARY EMBODIMENTS

First Embodiment

Figure 1:
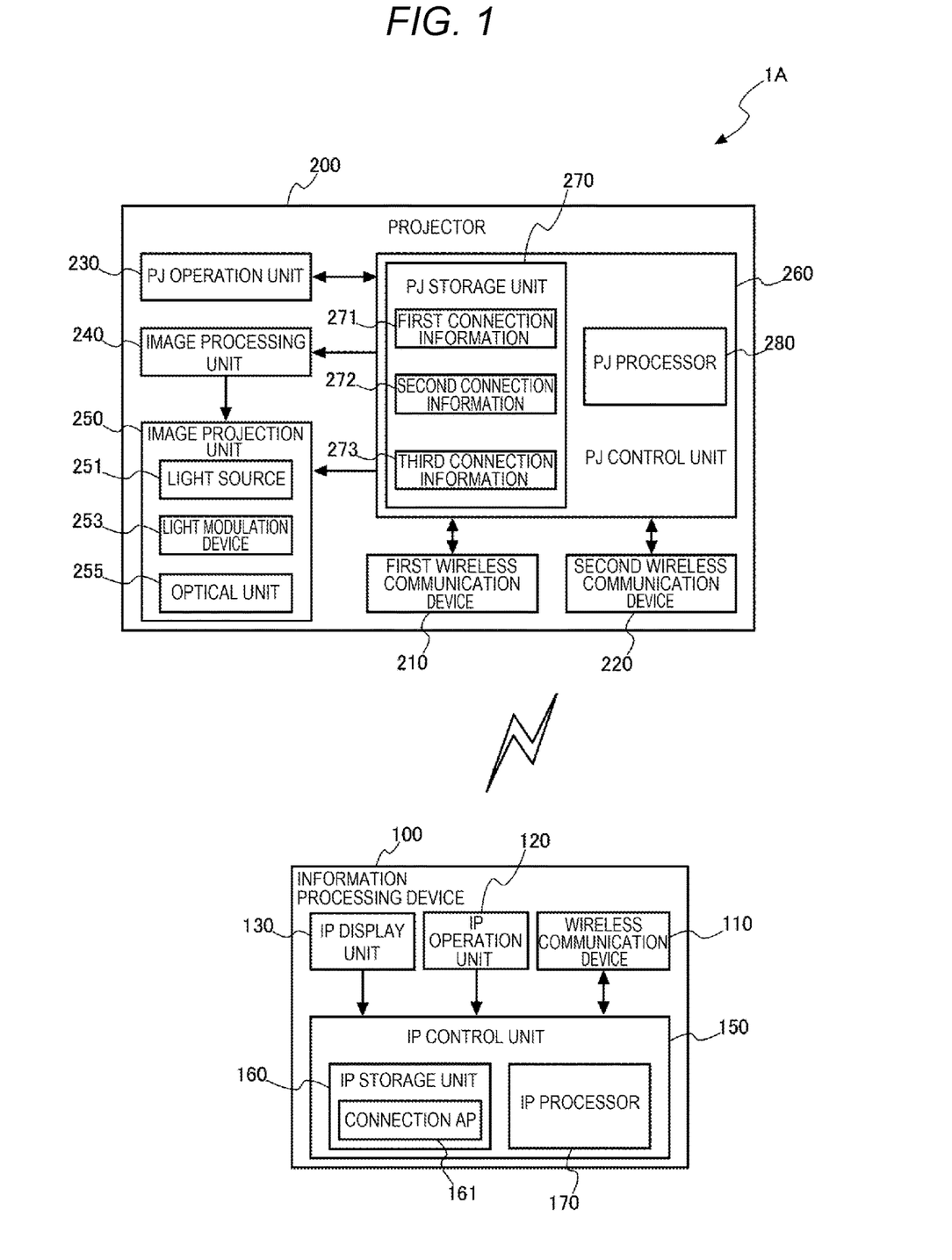
FIG. 1 is a block diagram showing the configuration of a wireless communication system according to a first embodiment.

An embodiment of the present disclosure will now be described with reference to the accompanying drawings.
Description of System Configuration of Wireless Communication System 1A FIG. 1 is a configuration view showing the system configuration of a wireless communication system 1A.

The wireless communication system 1A has an information processing device 100 and a projector 200, which is a display device.

As the information processing device 100, for example, a laptop computer, a tablet computer, a smartphone or the like is used. The information processing device 100 is wirelessly connected to the projector 200 and transmits data such as image data to the projector 200.

The projector 200 processes data received from the information processing device 100, generates image light based on the received image data, and projects the generated image light onto a projection surface, not illustrated.

Description of Configuration of Information Processing Device 100

The configuration of the information processing device 100 will now be described.

The information processing device 100 has a wireless communication device 110, an IP operation unit 120, an IP display unit 130, and an IP control unit 150.

The wireless communication device 110 is equivalent to a third wireless communication device. The wireless communication device 110 is wirelessly connected to the projector 200 and communicates data with the projector 200.

The IP operation unit 120 is formed of, for example, an input device such as a mouse or a keyboard and accepts an operation by a user. The IP operation unit 120 outputs an operation signal corresponding to the accepted operation to the IP control unit 150.

The IP display unit 130 has a touch panel 131 including a display panel such as a liquid crystal panel or an organic EL (electroluminescence) panel and a sensor detecting a touch operation on the display panel.

The IP control unit 150 has an IP storage unit 160 and an IP processor 170.

The IP storage unit 160 has a main storage device such as a RAM (random-access memory) and a ROM (read-only memory). The IP storage unit 160 also has an auxiliary storage device such as an SSD (solid-state drive) and an HDD (hard disk drive).

The RAM is used to temporarily store various data. The ROM stores a control program controlling an operation of the information processing device 100 and various setting information or the like. The control program includes an application program. Particularly, the information processing device 100 in this embodiment stores an application program used for wireless connection to the projector 200. This application program is referred to as a connection AP 161. The auxiliary storage device stores data such as image data to be supplied to the projector 200.

The IP processor 170 is an arithmetic processing device such as a CPU (central processing unit) or an MPU (micro processing unit). The IP processor 170 executes the control program and thus controls each part of the information processing device 100. The IP processor 170 may be formed of a single processor or a plurality of processors.

When accepting an operation of selecting the connection AP 161 by an operation to the IP operation unit 120 or by a touch operation, the IP control unit 150 executes the selected connection AP 161 and causes the touch panel 131 to display an application screen 133. When accepting an operation on application screen 133, the IP control unit 150 controls each part of the information processing device 100 according to the accepted operation. For example, the IP control unit 150 transmits a connection request to the projector 200 and wirelessly connect to the projector 200. The IP control unit 150 also reads out image data from the IP storage unit 160 and transmits the read-out image data to the wirelessly connected projector 200.

Figure 2:
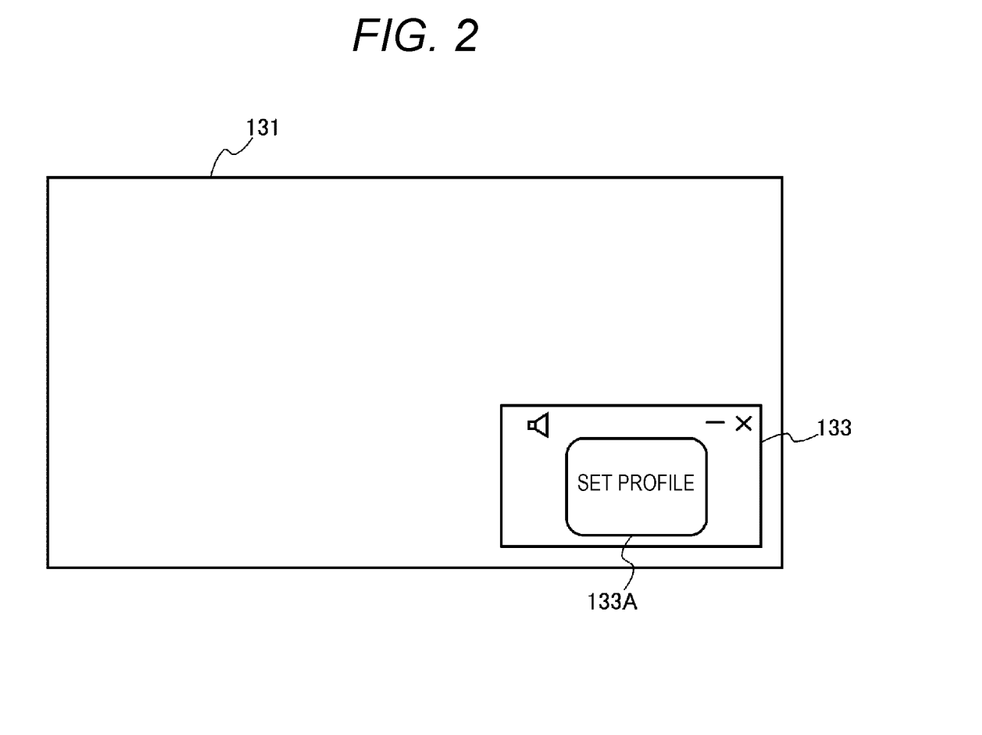
FIG. 2 shows an example of an application screen displayed on a display panel of an information processing device.
Figure 3:
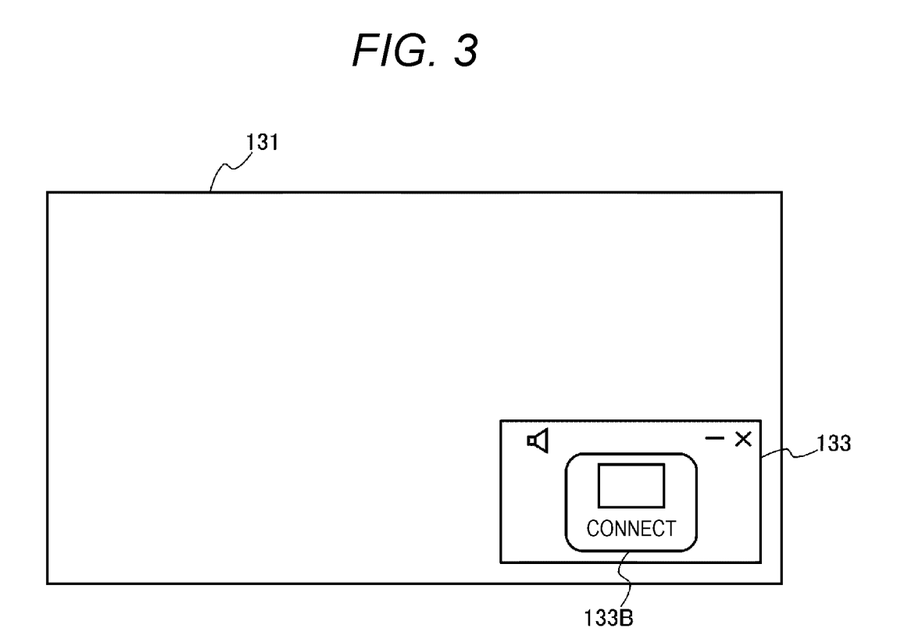
FIG. 3 shows an example of the application screen displayed on the display panel of the information processing device.
Figure 4:
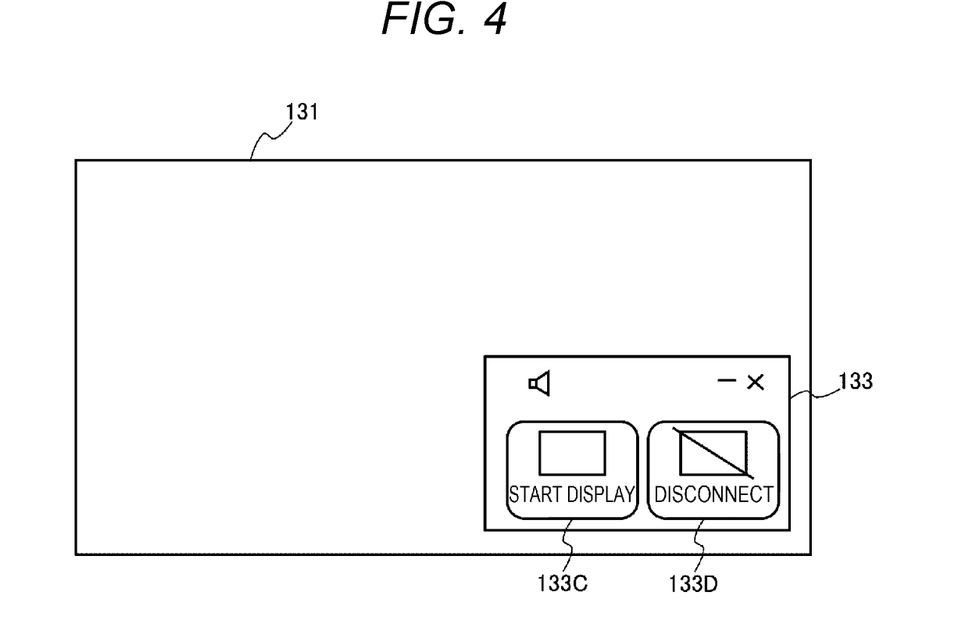
FIG. 4 shows an example of the application screen displayed on the display panel of the information processing device.

FIGS. 2, 3, and 4 show an example of the application screen 133 displayed on the touch panel 131.

FIG. 2 shows an initial screen displayed when the connection AP 161 is started up for the first time. On the initial screen of the application screen 133, a profile setting icon 133A is displayed.

When the profile setting icon 133A is selected, the IP control unit 150 causes the application screen 133 to display information about an SSID received by the wireless communication device 110. When a first SSID, described later, is selected from among SSIDs displayed on the application screen 133, the IP control unit 150 transmits a connection request with preset extended information to the projector 200. Subsequently, the IP control unit 150 communicates data with the projector 200 and acquires a second SSID and an encryption key, described later, from the projector 200, as a profile of the connection AP 161. The IP control unit 150 stores the acquired second SSID and encryption key in the IP storage unit 160, as the profile of the connection AP 161. Details of this processing will be described later.

FIG. 3 shows a state where a connection icon 133B for wirelessly connecting the information processing device 100 to the projector 200 is displayed.

When the connection icon 133B is selected, the IP control unit 150 refers to the second SSID and the encryption key registered as the profile of the connection AP 161 and transmits a connection request to a first wireless communication device 210 operating as an access point of the second SSID. Subsequently, when requested by the projector 200 to transmit an encryption key, the IP control unit 150 transmits the encryption key registered as the profile to the projector 200 and thus causes the projector 200 to authenticate the encryption key. When the authentication of the encryption key is successful, the information processing device 100 is wirelessly connected to the first wireless communication device 210.

FIG. 4 shows the application screen 133 displayed on the touch panel 131 when the information processing device 100 is wirelessly connected to the projector 200. On this application screen 133, a displays start icon 133C for starting the supply of image data to the projector 200 and causing the projector 200 to start displaying an image, and a disconnection icon 133D for disconnecting the wireless connection to the projector 200, are displayed.

Description of Configuration of Projector 200

The configuration of the projector 200 will now be described.

The projector 200 has the first wireless communication device 210, a second wireless communication device 220, a PJ operation unit 230, an image processing unit 240, an image projection unit 250, and a PJ control unit 260.

The first wireless communication device 210 performs wireless communication via a wireless LAN, for example, based on the IEEE (Institute of Electrical and Electronics Engineers) 802.11 standard. The second wireless communication device 220, too, performs wireless communication via a wireless LAN based on the IEEE 802.11 standard.

The PJ operation unit 230 has a plurality of operation keys for the user to give various instructions to the projector 200. The operation keys provided in the PJ operation unit 230 include a power key for switching on and off a power supply, a change key for changing operation modes of the projector 200, and the like. The operation modes of the projector 200 include a normal mode and a pairing mode. The normal mode is a mode in which the projector 200 generates image light based on image data received from outside and projects the generated image light onto a projection surface. The pairing mode is an operation mode in which the first wireless communication device 210 is paired with an external device such as the information processing device 100.

To the image processing unit 240, image data is inputted from the PJ control unit 260. To the PJ control unit 260, image data received by the first wireless communication device 210 or the second wireless communication device 220 is inputted. The PJ control unit 260 outputs the inputted image data to the image processing unit 240. At this point, the PJ control unit 260 may output a parameter corresponding to image processing to be executed by the image processing unit 240, to the image processing unit 240.

The image processing unit 240 loads the inputted image data into a frame memory, not illustrated, and performs image processing on the loaded image data. The image processing performed by the image processing unit 240 includes, for example, resolution conversion processing, shape correction processing such as distortion correction, digital zoom processing, color tone correction processing, luminance correction processing, and the like. The image processing unit 240 executes the processing designated by the PJ control unit 260 and performs the processing using the parameter inputted from the PJ control unit 260 according to need. The image processing unit 240 can also execute a combination of a plurality of types of processing, of the above processing. The image processing unit 240 reads out the processed image data from the frame memory and outputs the read-out image data to the image projection unit 250 as image information.

The image projection unit 250 has a light source 251, a light modulation device 253, an optical unit 255, and the like. To the light modulation device 253, the image information is inputted from the image processing unit 240. The light modulation device 253 modulates light emitted from the light source 251 into light corresponding to the image information and thus generates image light. The modulated image light is projected in an enlarged form on the projection surface by the optical unit 255.

The PJ control unit 260 is a computer device having a PJ storage unit 270 and a PJ processor 280.

The PJ storage unit 270 has a main storage device such as a RAM and a ROM. The RAM is used to temporarily store various data and the like. The ROM stores a control program controlling an operation of the projector 200 and various setting information or the like.

The setting information stored in the PJ storage unit 270 includes first connection information 271, second connection information 272, and third connection information 273.

The first connection information 271, the second connection information 272, and the third connection information 273 each include an SSID (service set identifier), which is the identification name of an access point, and an encryption key. In the description below, the SSID included in the first connection information 271 is referred to as a first SSID. The SSID included in the second connection information 272 is referred to as a second SSID. The SSID included in the third connection information 273 is referred to as a third SSID.

The first connection information 271 and the second connection information 272 are information for wirelessly connecting to the first wireless communication device 210. When the operation mode of the projector 200 is changed from the normal mode to the pairing mode, the first wireless communication device 210 operates as an access point of the first SSID. When the operation mode of the projector 200 is changed from the pairing mode to the normal mode, the first wireless communication device 210 ends the operation as the access point of the first SSID and operates as an access point of the second SSID. The first SSID is made public and broadcast by the first wireless communication device 210. However, the second SSID is a stealth SSID, which is not made public, and is not broadcast by the first wireless communication device 210.

The first connection information 271 is connection information used for a provisional connection. The second connection information 272 is connection information used for a regular connection.

The third connection information 273 is information for wirelessly connecting to the second wireless communication device 220. The second wireless communication device 220 operates as an access point of the second SSID. The second wireless communication device 220 operates as the access point of the second SSID even when the operation mode of the projector 200 is changed from the normal mode to the pairing mode or from the pairing mode to the normal mode. The third SSID is made public and broadcast by the second wireless communication device 220. The third connection information 273 is connection information used for a regular connection.

The PJ processor 280 is an arithmetic processing device such as a CPU or an MPU. The PJ processor 280 executes the control program and thus controls each part of the projector 200. The PJ processor 280 may be formed of a single processor or a plurality of processors.

The PJ control unit 260 controls the first wireless communication device 210 and the second wireless communication device 220 and causes these wireless communication devices to execute wireless communication.

When the power of the projector 200 is turned on, the PJ control unit 260 causes the second wireless communication device 220 to broadcast a beacon signal including the third SSID. While the power of the projector 200 is on, the PJ control unit 260 causes the second wireless communication device 220 to broadcast a beacon signal including the third SSID.

When receiving a connection request to the second wireless communication device 220 operating as an access point of the third SSID, the PJ control unit 260 requests the transmission source of the received connection request to transmit an encryption key and authenticates the encryption key received from the transmission source. When the authentication of the encryption key is successful, the PJ control unit 260 causes the transmission source of the connection request to be wirelessly connected to the second wireless communication device 220. Thus, the transmission source of the connection request and the second wireless communication device 220 start a regular connection using the third connection information 273.

When the operation mode of the projector 200 is changed from the normal mode to the pairing mode, the PJ control unit 260 causes the first wireless communication device 210 to broadcast a beacon signal including the first SSID. Until the operation mode of the projector 200 is changed to the normal mode, the PJ control unit 260 causes the first wireless communication device 210 to broadcast a beacon signal including the first SSID.

When receiving a connection request to the first wireless communication device 210 operating as the access point of the first SSID, the PJ control unit 260 determines whether this connection request includes preset extended information or not. The PJ control unit 260 determines whether the connection request includes preset extended information or not, and thus determines whether the transmission source is a transmission source satisfying a preset condition or not. When the connection request does not include the extended information, the PJ control unit 260 rejects the connection request received by the first wireless communication device 210 and does not cause the transmission source of the connection request to be wirelessly connected to the first wireless communication device 210.

When the connection request received by the first wireless communication device 210 includes the preset extended information, the PJ control unit 260 requests the transmission source of the connection request to transmit an encryption key and authenticates the encryption key received from the transmission source. When the authentication of the encryption key is successful, the PJ control unit 260 transmits the second SSID and the encryption key included in the second connection information 272 to the transmission source of the connection request.

When receiving the second SSID and the encryption key from the projector 200, the IP control unit 150 causes the IP storage unit 160 to store the second SSID and the encryption key as the profile of the connection AP 161.

When the connection AP 161 is selected and started and the connection icon 133B is selected, the IP control unit 150 transmits a connection request to the first wireless communication device 210 operating as the access point of the second SSID. When the first wireless communication device 210 receives the connection request, the PJ control unit 260 requests the information processing device 100, which is the transmission source of the connection request, to transmit an encryption key, and authenticates the received encryption key. When the authentication of the encryption key is successful, the PJ control unit 260 causes the information processing device 100 to be wirelessly connected to the first wireless communication device 210. Thus, the information processing device 100 and the first wireless communication device 210 of the projector 200 start a regular connection using the second connection information.

When the number of information processing devices 100 wirelessly connected to the first wireless communication device 210 is increased, the PJ control unit 260 causes a preset number of information processing devices 100, of the information processing devices 100 wirelessly connected to the first wireless communication device 210, to be connected to the second wireless communication device 220. When the communication speed of the first wireless communication device 210 drops to a preset reference value or below, the PJ control unit 260 selects a preset number of information processing devices 100 from among the wirelessly connected information processing devices 100. The PJ control unit 260 transmits the second SSID and the encryption key of the second wireless communication device 220 to the selected information processing devices 100 and causes the set number of information processing devices 100 to be wirelessly connected to the second wireless communication device 220. Thus, a drop in the communication quality of the first wireless communication device 210 can be restrained.

Operation of Information Processing Device 100

Figure 5:
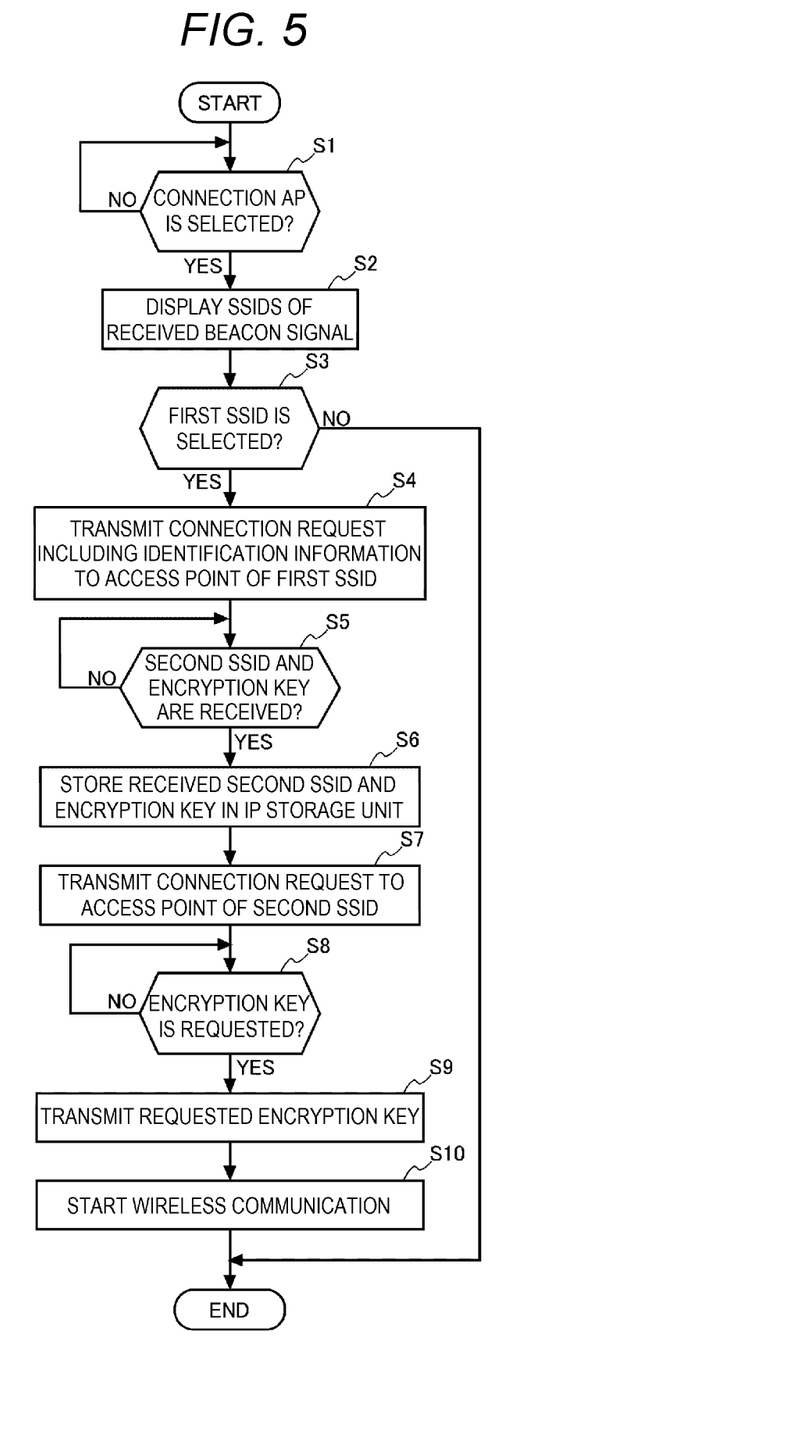
FIG. 5 is a flowchart showing an operation of the information processing device.

FIG. 5 is a flowchart showing an operation of the information processing device 100.

The operation of the information processing device 100 will now be described with reference to FIG. 5.

First, the IP control unit 150 determines whether or not the connection AP 161 is selected by an operation to the IP operation unit 120 or by a touch operation on the touch panel (step S1). When the connection AP 161 is not selected (NO in step S1), the IP control unit 150 does not start processing until the connection AP 161 is selected.

When the connection AP 161 is selected (YES in step S1), the IP control unit 150 executes the connection AP 161 and causes the touch panel 131 to display the application screen 133. Next, the IP control unit 150 causes the application screen 133 to display a list of SSIDs included in a beacon signal received by the wireless communication device 110 (step S2).

The IP control unit 150 determines whether the first SSID is selected from among the plurality of SSIDs displayed on the application screen 133 or not (step S3). When the first SSID is not selected (NO in step S3), the IP control unit 150 ends this processing flow.

When the first SSID is selected (YES in step S3), the IP control unit 150 transmits a connection request including the identification information of the connection AP 161 to the access point of the selected first SSID (step S4).

Next, the IP control unit 150 determines whether the second SSID and the encryption key are received from the access point of the first SSID or not (step S5). When the second SSID and the encryption key are not received (NO in step S5), the IP control unit 150 waits until the second SSID and the encryption key are received.

Meanwhile, when the second SSID and the encryption key are received, the IP control unit 150 stores the received second SSID and encryption key in the IP storage unit 160 as the profile of the connection AP 161.

Next, the IP control unit 150 transmits a connection request to the access point of the second SSID (step S7) and waits until the encryption key is requested (step S8). When receiving a transmission request for the encryption key (YES in step S8), the IP control unit 150 transmits the encryption key stored in the IP storage unit 160 as the profile of the connection AP 161 to the projector 200 of the requesting party (step S9). Subsequently, the projector 200 performs authentication based on the encryption key received from the information processing device 100. When the projector 200 is successful in the authentication, the information processing device 100 starts wireless communication via the first wireless communication device 210, which is the access point of the second SSID (step S10).

Operation of Projector

Figure 6:
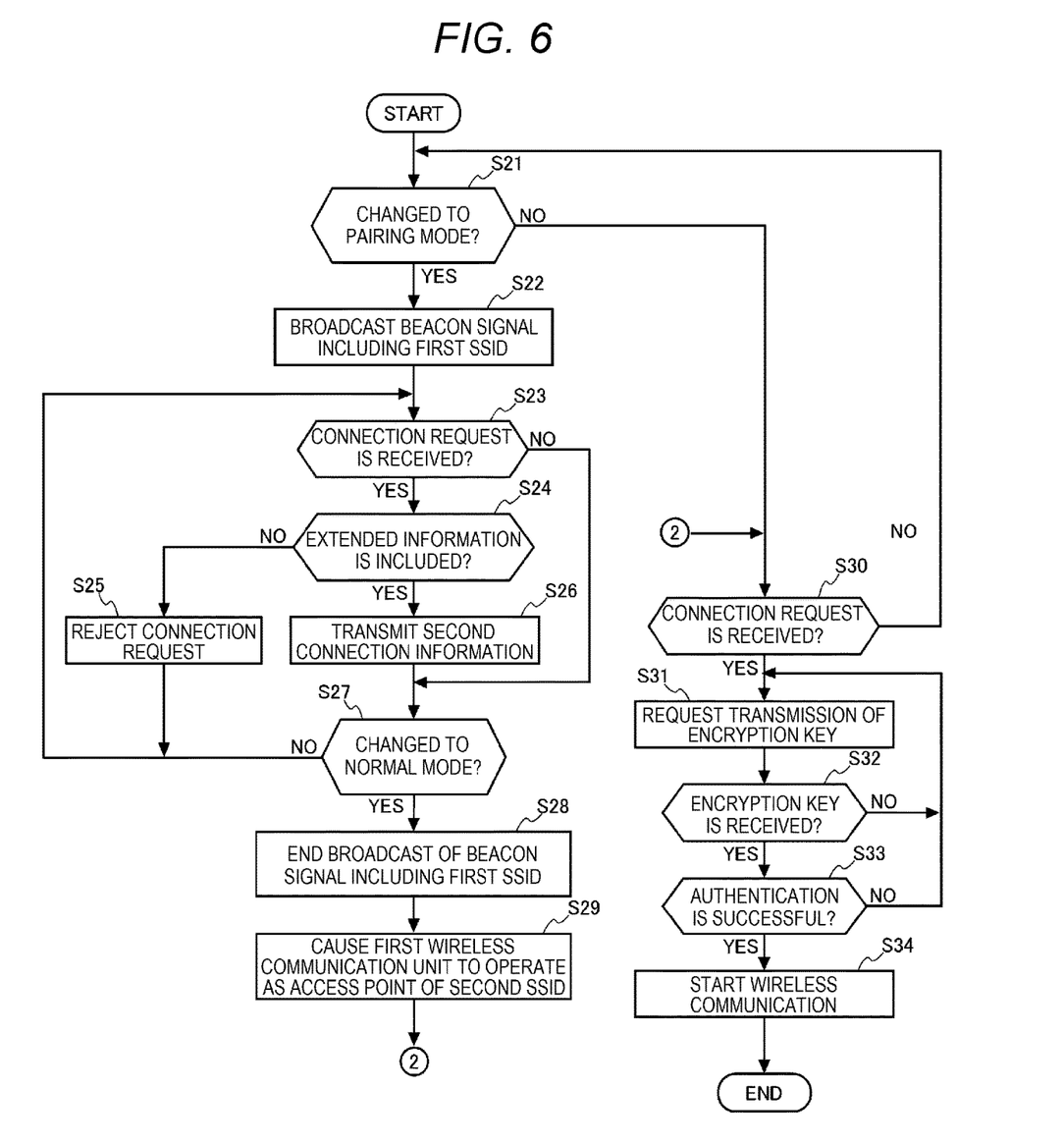
FIG. 6 is a flowchart showing an operation of a projector.

FIG. 6 is a flowchart showing an operation of the projector 200.

The operation of the projector 200 will now be described with reference to the flowchart shown in FIG. 6.

First, the PJ control unit 260 determines whether or not the operation mode of the projector 200 is changed from the normal mode to the pairing mode as the change key of the PJ operation unit 230 is operated (step S21). When the operation mode is not changed (NO in step S21), the PJ control unit 260 shifts to the determination of step S30. The operation of the PJ control unit 260 from step S30 onward will be described later.

When the operation mode is changed to the pairing mode (YES in step S21), the PJ control unit 260 causes the first wireless communication device 210 to broadcast a beacon signal including the first SSID (step S22). The PJ control unit 260 then determines whether the first wireless communication device 210, which is the access point of the first SSID, has received a connection request or not (step S23).

When the first wireless communication device 210 has not received a connection request (NO in step S23), the PJ control unit 260 shifts to the determination of step S27 and determines whether the operation mode of the projector 200 is changed to the normal mode or not (step S27). When the operation mode is changed to the normal mode (YES in step S27), the PJ control unit 260 causes the first wireless communication device 210 to end the broadcast of the beacon signal including the first SSID (step S28). When the operation mode is not changed to the normal mode (NO in step S27), the PJ control unit 260 returns to the determination of step S23.

When the first wireless communication device 210 has received a connection request (YES in step S23), the PJ control unit 260 determines whether the received connection request includes extended information or not (step S24). When the received connection request does not include extended information (NO in step S24), the PJ control unit 260 rejects the connection requested received in step S23 (step S25).

When the received connection request includes extended information (YES in step S24), the PJ control unit 260 transmits the second SSID and the encryption key included in the second connection information 272 to the transmission source of the connection request (step S26). Subsequently, the PJ control unit 260 determines whether the operation mode is changed to the normal mode or not (step S27). When the operation mode is not changed to the normal mode (NO in step S27), the PJ control unit 260 returns to the determination of step S23. Meanwhile, when the operation mode is changed to the normal mode (YES in step S27), the PJ control unit 260 causes the first wireless communication device 210 to end the broadcast of the beacon signal including the first SSID (step S28). The PJ control unit 260 then causes the first wireless communication device 210 to operate as the access point of the second SSID (step S29).

Next, the PJ control unit 260 determines whether the first wireless communication device 210 operating as the access point of the second SSID has received a connection request or not (step S30). When the first wireless communication device 210 has not received a connection request (NO in step S30), the PJ control unit 260 returns to the determination of step S21. When the first wireless communication device 210 has received a connection request (YES in step S30), the PJ control unit 260 requests the transmission source of the connection request to transmit the encryption key (step S31) and waits until receiving the encryption key (step S32).

When receiving the encryption key (YES in step S32), the PJ control unit 260 authenticates the received encryption key (step S33). When failing in the authentication of the encryption key (NO in step S33), the PJ control unit 260 requests the encryption key again (step S31). When successful in the authentication of the encryption key (YES in step S33), the PJ control unit 260 wirelessly connects the first wireless communication device 210 to the transmission source of the connection request and starts wireless communication (step S34).

As described above, the wireless communication system 1A has the information processing device 100 and the projector 200.

The projector 200 has the first wireless communication device 210 performing wireless communication.

The projector 200 causes the first wireless communication device 210 to transmit the first SSID of the first connection information 271 as connection information for a provisional connection.

When the first wireless communication device 210 operating as the access point of the first SSID has received a connection request, the projector 200 determines whether the transmission source of the received connection request is a transmission source satisfying a preset condition or not.

When the transmission source is a transmission source satisfying the preset condition, the projector 200 transmits the second SSID and the encryption key of the second connection information 272 as connection information for a regular connection to this transmission source.

When the first wireless communication device 210 operating as the access point of the second SSID has received a connection request, the projector 200 performs authentication with the encryption key and starts wireless communication with the transmission source of the connection request.

Since the second SSID and the encryption key are transmitted only to the transmission source satisfying the preset condition, the number of information processing devices 100 connected to the first wireless communication device 210 can be limited. Therefore, a drop in the communication quality of the first wireless communication device 210 can be restrained.

The projector 200 has the second wireless communication device 220.

The projector 200 causes the second wireless communication device 220 to transmit the third SSID of the third connection information 273 as connection information for a regular connection.

When the second wireless communication device 220 operating as the access point of the third SSID has received a connection request, the projector 200 starts wireless communication with the transmission source of the connection request.

Therefore, wireless communication with a device other than the transmission source satisfying the preset condition can be performed via the second wireless communication device 220.

When the communication speed of the first wireless communication device 210 has dropped to a preset speed or below, the projector 200 transmits the third SSID and the encryption key included in the third connection information 273 to the information processing device 100 wirelessly connected to the first wireless communication device 210.

When the second wireless communication device 220 operating as the access point of the third SSID has received a connection request, the projector 200 wirelessly connects the transmission source of the connection request to the second wireless communication device 220 and starts a regular connection using the third connection information 273.

Therefore, a drop in the communication speed of the first wireless communication device 210 can be restrained.

When the transmission source of the connection request executes the preset connection AP 161 and the connection request is a request sent under the control of the connection AP 161, the projector 200 determines that the preset condition is satisfied, and transmits the second SSID and the encryption key to the transmission source.

Therefore, the information processing device 100 with the preset connection AP 161 installed therein can be wirelessly connected to the first wireless communication device 210 operating as the access point of the second SSID.

The second SSID transmitted from the projector 200 by the first wireless communication device 210 is a stealth SSID. Therefore, connection of a large number of information processing devices 100 to the first wireless communication device 210 operating as the access point of the second SSID can be restrained.

Second Embodiment

Figure 7:
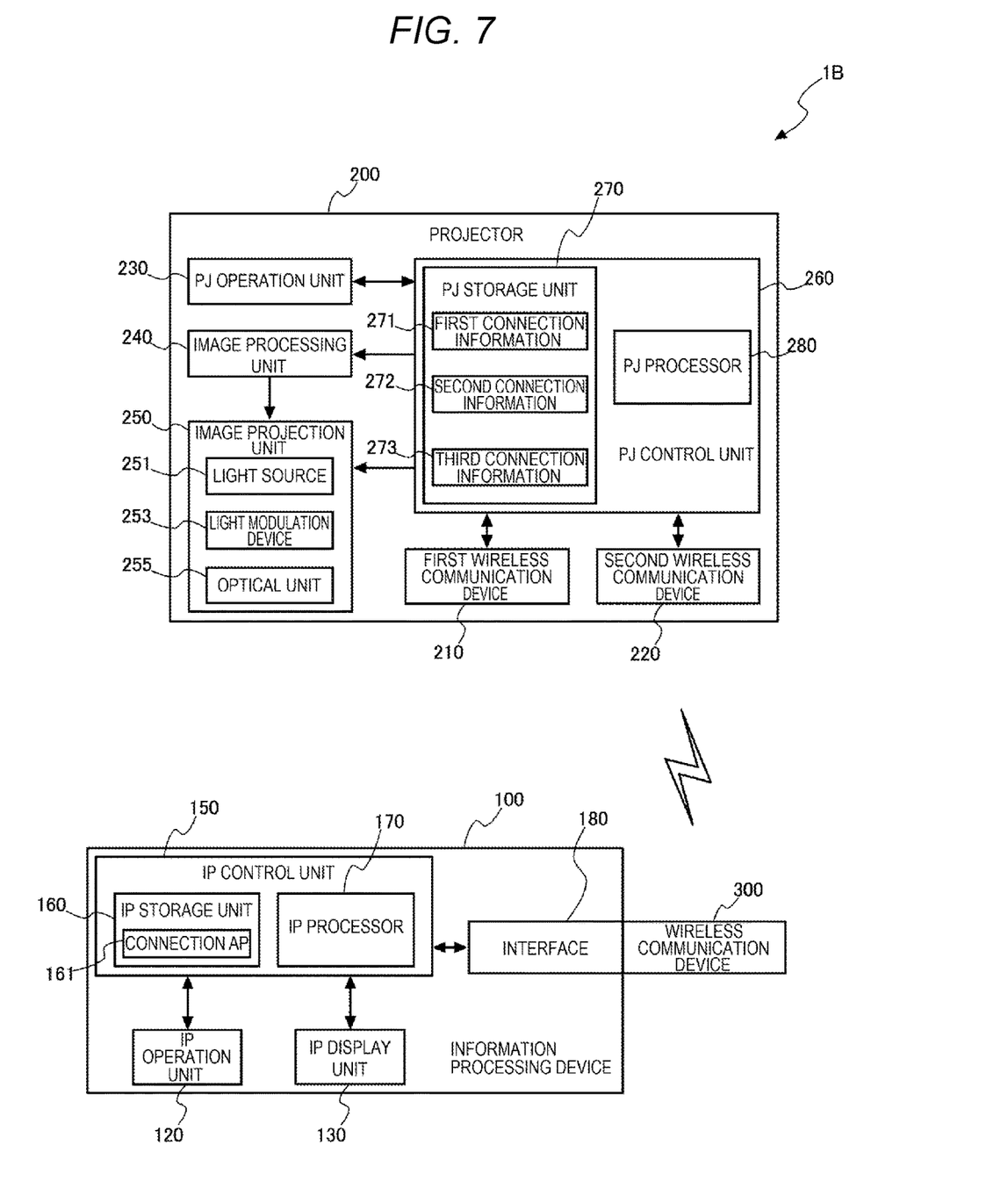
FIG. 7 is a block diagram showing the configuration of a wireless communication system according to a second embodiment.

FIG. 7 is a system configuration view showing the configuration of a wireless communication system 1B according to a second embodiment.

The wireless communication system 1B according to the second embodiment, too, has the information processing device 100 and the projector 200. The information processing device 100 does not have the wireless communication device 110. A wireless communication device 300 is externally coupled to an interface 180 of the information processing device 100. As the wireless communication device 300, for example, a USB dongle having a wireless communication function can be used.

The IP control unit 150 in the second embodiment executes the processing of steps S1 to S6 in the flowchart shown in FIG. 5 and receives the second SSID and the encryption key from the projector 200. In this case, the wireless communication device 300 is used for the wireless communication with the projector 200.

The IP control unit 150 stores the received second SSID and encryption key as a profile in a memory provided in the wireless communication device 300. Subsequently, the IP control unit 150 controls the wireless communication device 300 to transmit a connection request to the access point of the second SSID registered as the profile, then has the encryption authenticated, and starts wireless communication with the first wireless communication device 210, which is the access point of the second SSID.

The wireless communication system 1B according to the second embodiment can achieve effects similar to those of the first embodiment.

The above embodiments are preferred embodiments of the present disclosure. However, the present disclosure is not limited to the above embodiments and can be implemented with various modifications without departing from the spirit and scope of the present disclosure.

For example, the procedures in the flowchart described with reference to FIGS. 5 and 6 may be the following procedures. First, the wireless communication device 300 in the second embodiment is first connected to the projector 200 by a user's operation. Preset identification information is written in advance in the memory of the wireless communication device 300. When the wireless communication device 300 with the preset identification information written therein is connected, the PJ control unit 260 writes the second SSID and the encryption key of the first wireless communication device 210 into the connected wireless communication device 300. Subsequently, the wireless communication device 300 with the second SSID and the encryption key written therein is connected to the information processing device 100. Thus, the wireless communication device 300 is wirelessly connected to the first wireless communication device 210 operating as the access point of the second SSID.

As for the preset identification information, for example, the wireless communication device 300 may be connected to the information processing device 100 in advance, and the connection AP 161 may be started up and the IP control unit 150 under the control of the connection AP 161 may write the identification information into the wireless communication device 300.

The light modulation element provided in the light modulation device 253 may be a transmission-type liquid crystal panel or a reflection-type liquid crystal panel. The light modulation element may have a configuration using a digital micromirror device or a combination of a digital micromirror device and a color wheel. The light modulation device 253 may also employ a configuration that can modulate light emitted from the light source, other than the liquid crystal panel and the DMD.

Each functional unit in the projector 200 shown in FIG. 1 represents a functional configuration and is not limited to any specific form of embodiment. That is, individual pieces of hardware corresponding to individual functional units need not necessarily be installed. A single processor may be able to execute a program to implement functions of a plurality of functional units. In the embodiments, a part of the functions implemented by software may be implemented by hardware and a part of the functions implemented by hardware may be implemented by software. Also, any change can be made to specific details of the configuration of each of the other parts of the projector without departing from the spirit and scope of the present disclosure.

The processing steps in the flowchart showing the operation of the PJ control unit 260 shown in FIG. 6 are provided by splitting the processing according to the main processing content in order to facilitate understanding of the processing by the PJ control unit 260. The present disclosure is not limited by the way to split the processing in processing units and the names thereof. The same applies to the flowchart showing the operation of the IP control unit 150 of the information processing device 100 shown in FIG. 5.

When implementing the wireless communication control method using the computer provided in the projector 200, the program to be executed by the computer can be configured in the form of a recording medium or a transmission medium transmitting the program. As the recording medium, a magnetic or optical recording medium, or a semiconductor memory device can be used. Specifically, a portable recording medium such as a flexible disk, an HDD (hard disk drive), a CD-ROM, a DVD, a Blu-ray disc, a magneto-optical disk, a flash memory or a card-type recording medium, or a fixed recording medium can be employed. The recording medium may also be a non-volatile storage device such as a RAM, a ROM or an HDD, which is an internal storage device provided in a server device. Blu-ray is a registered trademark.

What is claimed is:

1. A wireless communication control method comprising:
   transmitting first connection information by a first wireless communication device of a display device;
   when a first connection request from a first transmission source is received by the first wireless communication device, the first connection request using the first connection information, determining whether the first transmission source satisfies a condition or not, the condition being the received first connection request including preset extended information;
   transmitting second connection information to the first transmission source when it is determined that the first transmission source satisfies the condition;
   when a second connection request is received by the first wireless communication device, the second connection request using the second connection information, starting a connection using the second connection information between the first transmission source and the first wireless communication device;
   when a communication speed between the first transmission source and the first wireless communication device drops to a preset speed or below, transmitting third connection information to the first transmission source; and
   when a connection request using the third connection information is received by a second wireless communication device of the display device, starting a connection using the third connection information between the first transmission source and the second wireless communication device.

2. The wireless communication control method according to claim 1, further comprising transmitting the third connection information by the second wireless communication device of the display device, when a connection request using the third connection information from a second transmission source is received by the second wireless communication device, starting a connection using the third connection information between the second transmission source and the second wireless communication device.

3. The wireless communication control method according to claim 1, wherein the condition is that a connection request using the first connection information is sent under the control of a predetermined application program executed by the first transmission source.

4. The wireless communication control method according to claim 1, wherein the first connection information includes SSID information, and the wireless communication control method further comprises:

when the connection request using the first connection information is received and it is determined that the first transmission source satisfies the condition, transmitting the second connection information including stealth SSID information and an encryption key to the first transmission source.

5. A display device comprising:

a first transmission device;

a second wireless communication device; and at least one processor programmed to transmit first connection information using the first wireless communication device, when a first connection request from a first transmission source is received by the first wireless communication device, the first connection request using the first connection information, determine whether the first transmission source satisfies a condition or not, the condition being the received first connection request including preset extended information, transmit second connection information to the first transmission source when it is determined that the first transmission source satisfies the condition, when a second connection request is received by the first wireless communication device, the second connection request using the second connection information, start a connection using the second connection information between the first transmission source and the first wireless communication device, when a communication speed between the first transmission source and the first wireless communication device drops to a preset speed or below, transmit third connection information to the first transmission source, and when a connection request using the third connection information is received by the second wireless communication device, start a connection using the third connection information between the first transmission source and the second wireless communication device.

6. The display device according to claim 5, wherein the at least one processor further programmed to transmit, using the second wireless communication device, the third connection information for a regular connection, and when a connection request using the third connection information from a second transmission source is received by the second wireless communication device, start a connection using the third connection information between the second transmission source and the second wireless communication device.

7. A wireless communication system comprising:

a display device having a first wireless communication device and a second wireless communication device; and an information processing device, wherein the first wireless communication device is externally coupled to the information processing device, wherein the display device transmits first connection information using the first wireless communication device, when receiving the first connection information, the information processing device transmits a first connection request to the display device, the first connection request using the first connection information, when the first connection request is received by the first wireless communication device, the display device determines whether the information processing device satisfies a condition or not, the condition being the received first connection request including preset extended information, the display device transmits second connection information to the information processing device when it is determined that the information processing device satisfies the condition, and when receiving the second connection information, the information processing device starts a connection based on the second connection information between the display device and wireless communication device, when a communication speed between the first transmission source and the first wireless communication device drops to a preset speed or below, transmit third connection information to the first transmission source, and when a connection request using the third connection information is received by the second wireless communication device, start a connection using the third connection information between the first transmission source and the second wireless communication device.

* * * * *